F. ROWE & J. W. RAPPENGLUECK.
LATHE.
APPLICATION FILED NOV. 18, 1909.

979,034.

Patented Dec. 20, 1910.

UNITED STATES PATENT OFFICE.

FRANK ROWE AND JOSEPH W. RAPPENGLUECK, OF PORT HURON, MICHIGAN; SAID RAPPENGLUECK ASSIGNOR TO SAID ROWE.

LATHE.

979,034.  Specification of Letters Patent.  Patented Dec. 20, 1910.

Application filed November 18, 1909. Serial No. 528,695.

*To all whom it may concern:*

Be it known that we, FRANK ROWE and JOSEPH W. RAPPENGLUECK, citizens of the United States, residing at Port Huron, in the county of St. Clair, State of Michigan, have invented certain new and useful Improvements in Lathes; and we do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to lathes, and consists in the construction and arrangement of parts hereinafter more fully set forth and pointed out particularly in the claims.

The object of the invention is to provide the live spindle of a lathe with a center, said center having a stop or shoulder against which the faced work may be carried in placing it in the lathe to properly position said work, said center having a spring pressed center pin which projects beyond said arresting shoulder or stop at the forward end of said center, said pin being adapted to recede as the work is placed in the lathe to permit said work to be carried against said shoulder when placed in position in the lathe, the tapered end of said pin remaining in engagement with the work to center it; provision being made for varying the tension upon the spring which normally holds the center pin extended and for permitting the pin to project farther from the center to compensate for any shortening in the length thereof incident to regrinding a new point thereon.

The above object is attained by the structure illustrated in the accompanying drawings, in which:—

Figure 1:
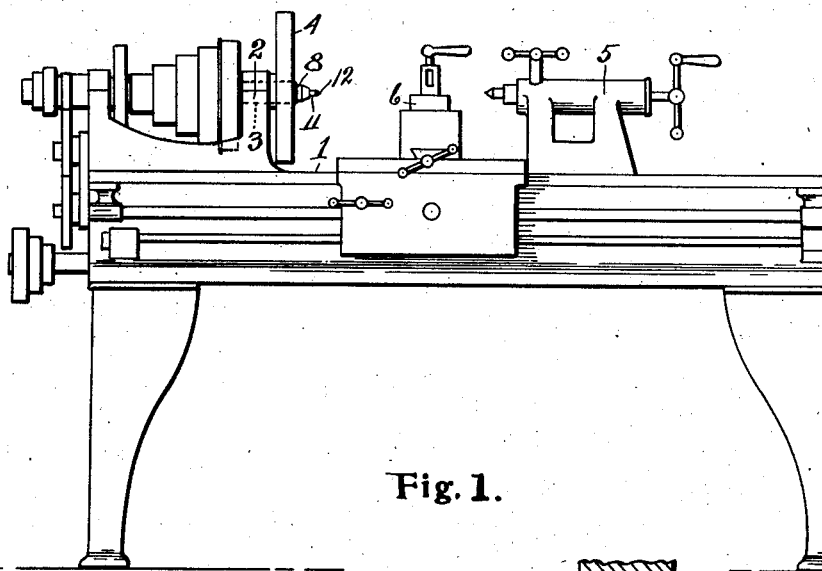
Figure 2:
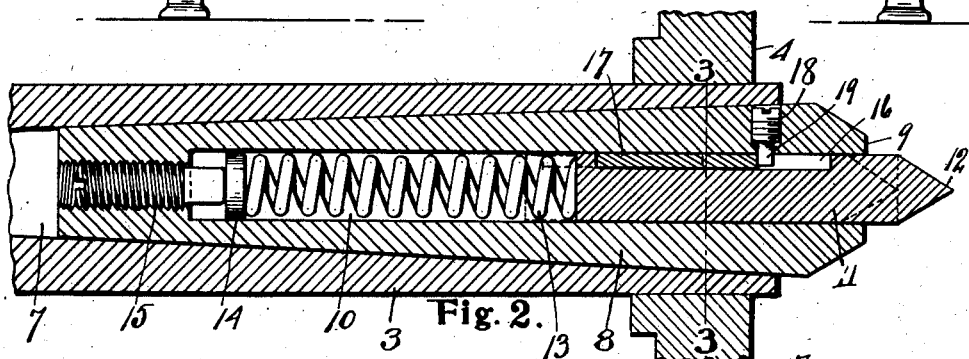
Figure 4:
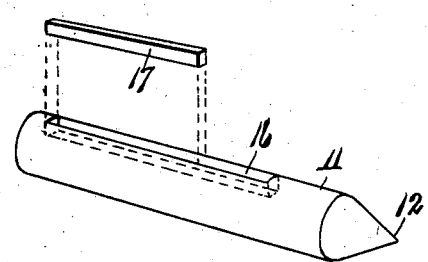
Figure 3:
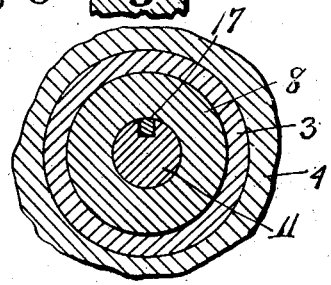

Figure 1 is an elevation of a lathe embodying this invention. Fig. 2 is an enlarged longitudinal section through the live spindle and center, showing the spring pressed center pin within the removable center in said spindle. Fig. 3 is a transverse section on line 3—3 of Fig. 2. Fig. 4 is a perspective view of the center pin, showing the key way therein and the key lifted from said way.

Referring to the characters of reference, 1 designates the lathe bed; 2 the head stock; 3 the live spindle; 4 the face plate carried thereon; 5 the tail stock, and 6 the tool rest, all of which are common in the art.

Formed in the spindle 3 is a tapered socket 7 in which is fitted the center 8. At the outer end of said center is a flat circular face forming a stop shoulder 9. Extending longitudinally of the center 8 is a bore 10 in the outer end of which is fitted a center pin 11 having a tapered point 12 to enter the center hole in the work. Also located within the bore of said center is a compressible spring 13, the forward end of which engages the rear end of the center pin. Bearing against the rear end of said spring is a washer 14 and engaging said washer is a screw 15 which is threaded in the rear end of said center and is adapted to crowd said washer against the rear end of said spring to regulate the tension thereof.

Extending longitudinally of the center pin 11 is a key way 16. Occupying the rear portion of said key way is a key 17. Threaded in the wall of the center 8 is a screw 18 having a reduced end portion 19 which extends into the way 16 in the center pin, the forward end of the key 17 in said way engaging the reduced end of the screw lying therein. The key 17 engaging the reduced end of the screw 18 prevents the center pin being forced out of the center by the spring 13, while the open or unoccupied portion of the key way 16 in advance of said screw allows the center pin to recede within the center 8 until arrested by the engagement of said screw with the outer end of said way, as shown by dotted lines in Fig. 2. The presence of the inner end of the screw 18 in the key way 16 of the spring pressed center pin causes said pin to turn with the center 8.

It is of material importance in turning many pieces of the same character upon which the same work is to be performed, in order to facilitate said work, especially where it consists of turning to a given diameter between fixed distances, to provide a stop which will arrest the pieces when placed in the lathe at a given point so that there may be an unvarying relation between a certain fixed point on the work to be turned and a predetermined position of the tool rest. We attain the desired object by providing the outer end of the live center 8 with a stop shoulder 9 against which the work after being faced off, may be carried and by providing a spring pressed center pin 11 which will recede sufficiently to allow the work centered in the lathe to engage said shoulder, the spring holding the pin with sufficient force to serve as the supporting center for the work. By this means the succeeding pieces of work may be readily placed in the lathe with the assurance that each succeeding piece will be brought to the same relative position, so that by moving the tool rest to a predetermined position with respect to each piece of work, the turning thereon may be always done at a given distance from the faced end.

Should the point of the center pin become broken so as to necessitate the regrinding of a point thereon, and the consequent shortening of said pin, provision is made for allowing said pin to project farther from the center 8 by cutting from the end of the key 17 a portion equal to the extent that the center pin is shortened by the operation of regrinding the point thereon. Should it be desired to remove the center pin entirely, it may be readily accomplished by withdrawing the screw 18 from engagement with the key 17. In case of heavy work where there is a greater lateral strain upon the center pin, additional tension may be added to the spring 13 to hold said pin to its work by a manipulation of the screw 15 to still further compress said spring within the bore of the center 8.

Having thus fully set forth our invention, what we claim as new and desire to secure by Letters Patent, is:—

1. In a lathe, the combination with a spindle, a center lying within and projecting beyond the end of said spindle having a stop at the outer end thereof, a movable center pin within said center, said center pin having a key way therein, a loose key occupying a portion of said way, a stop projecting into the unoccupied portion of said way at the end of said key, and a spring within the center for pressing the center pin outwardly.

2. In a lathe, the combination with a live spindle, a center fitted therein having a stop at its outer end which extends beyond the end of the spindle and face plate, a center pin within said center projecting beyond the face of said stop, a spring for pressing said center pin outwardly, means for holding said pin against the outward pressure of said spring, means for permitting said pin to recede within the center against pressure applied to the outer end thereof, and means for varying the tension upon said spring.

In testimony whereof, we sign this specification in the presence of two witnesses.

FRANK ROWE.
JOSEPH W. RAPPENGLUECK.

Witnesses:
ELLWYN C. SKIMIN,
MORRIS D. MACKOY.